United States Patent [19]

Reuter et al.

[11] Patent Number: 4,998,702
[45] Date of Patent: Mar. 12, 1991

[54] SUSPENSION APPARATUS FOR CONTROL DEVICE

[75] Inventors: Wolfgang Reuter, Burbach-Wurgendorf; Jurgen Debus, Dietzholztal; Lothar Lehr, Burbach-Oberdresselndorf, all of Fed. Rep. of Germany

[73] Assignee: Rittal-Werk Rudolf Loh GmbH & Co. KG, Fed. Rep. of Germany

[21] Appl. No.: 313,583

[22] Filed: Feb. 21, 1989

[30] Foreign Application Priority Data

Feb. 22, 1988 [DE] Fed. Rep. of Germany ....... 3805424

[51] Int. Cl.$^5$ ............................................. F16M 13/00
[52] U.S. Cl. ..................................... 248/278; 403/79; 403/157
[58] Field of Search ............... 248/122, 278, 674, 324, 248/279, 282, 284, 285, 289.1, 291; 403/50, 79, 157, 161, 292; 312/223; 16/223, 387, 390, 392; 52/117, 656; 901/28, 29

[56] References Cited

U.S. PATENT DOCUMENTS

| | | | |
|---|---|---|---|
| 1,551,332 | 8/1925 | Schramm . | |
| 3,072,374 | 1/1963 | Bodian | 248/278 |
| 3,771,226 | 11/1973 | Lieb et al. . | |
| 3,942,751 | 3/1976 | Fay . | |
| 4,307,672 | 12/1981 | Shikimi | 403/161 |
| 4,708,312 | 11/1987 | Rohr | 248/279 |
| 4,864,888 | 9/1989 | Iwata | 403/157 |

FOREIGN PATENT DOCUMENTS

| | | | |
|---|---|---|---|
| 0058540 | 8/1982 | European Pat. Off. . | |
| 1951209 | 4/1971 | Fed. Rep. of Germany | 403/79 |
| 3034013 | 9/1980 | Fed. Rep. of Germany . | |

Primary Examiner—Ramon O. Ramirez
Assistant Examiner—Robert A. Olson
Attorney, Agent, or Firm—Thomas W. Speckman; Douglas H. Pauley

[57] ABSTRACT

This invention relates to a suspension apparatus for control devices which can be assembled from a connection flange or connection rotary joint, support beam sections, elbow joints, or intermediate joints which can be connected with a wall or the body of a machine, and a coupling unit which can be connected to the control device. The support beam section comprises an essentially U-shaped base profile section and a cover profile section closing the same. The base profile section is divided, by means of a separating bar parallel to its crossbar, into a support part constructed as a closed hollow profile and an open U-shaped mounting part opposed to the bar. The connection bars, which proceed in a longitudinal direction in the support part and in the mounting part, are integrally formed with screw mountings. The intermediate joint comprises two joint parts which can be bolted directly to the front sides of the base profile section acting on one another, without impairing the positioning of the connection lines and the guiding of the same with the intermediate joint.

22 Claims, 2 Drawing Sheets

SUSPENSION APPARATUS FOR CONTROL DEVICE

BACKGROUND OF THE INVENTION

This invention relates to a suspension device for control devices which can be assembled from a connection flange or connection rotary joint, support beam sections, elbow joints, or intermediate joints connected to a wall or a machine body. A coupling unit can be connected to the control device. Support beam sections comprise of an essentially U-shaped base profile section and a cover profile section closing the same. The base profile section, with a separating bar proceeding parallel to its cross-bar, is divided into a support part constructed as a closed hollow profile and an open U-shaped mounting part opposed to the bar. Connecting bars, which proceed in a longitudinal direction in the support part and in the mounting part, are integrally formed with screw mountings.

With the connecting rotary joint, the intermediate joint and the coupling unit, there is a universal rotating capacity of the control device attached to the end of the suspension device. With the intermediary joints, two support beam sections acting on one another are rotatably connected with one another.

In conventional suspension apparatuses such as described in German Patent DE 30 34 013 A-1, support sections are connected with one another in an articulated manner with a rotary bearing, the rotary axis of which proceeds approximately perpendicular to longitudinal central axes of the support sections. Connection cables are also conducted in this pivot bearing, specifically laterally from the rotary axis of the pivot bearing. Thus the connection cables, during the rotating of the support sections, move against one another and are stressed to varying degrees. This can lead to damage of the connection cable. One further disadvantage which affects such known type of suspension device is that the installation of connection lines in the area of the pivot bearings is difficult and time consuming.

It is one object of this invention to provide an intermediary joint for a suspension apparatus of the type stated above, which has a simple construction and connects the bearing beam sections that rigidly act on one another so that they can absorb great stresses without making the installation of connection lines in the area of the intermediate joint more difficult, and thereby dispensing with a covering for connecting lines in the area of the intermediary joint.

In one embodiment of this invention, the intermediary joints comprise two attachment plates which essentially leave at least the cross-section of the mounting parts of the base profile sections free. The attachment plates have borings, for attachment screws, which are oriented to the screw mounts into the connecting bars of the base profile sections of the support beam sections which act on one another. Vertically projecting guide plates, which can be inserted into the support part and the mounting part of the base profile sections and support themselves therein, are integrally formed on the sides of the attachment plates positioned toward the front sides of the base profile section. Two spaced bearing support brackets are displaced relative to one another by the thickness of the bearing support brackets, and have aligning bearing support borings for mounting bearing support bolts or bearing support elements. The two spaced bearing support brackets are integrally formed and project perpendicular on the sides of the attachment plates which are oriented to one another. The intermediary joint is covered with a pleated bellows unit which is fixed to the base profile sections, which are closed with cover profile sections, of the support beam sections acting on one another.

The attachment plates are part of the two joint parts and can easily be rigidly bolted with the front sides of the base profile sections. Since the cross-section of the mounting parts of the support beam sections acting on one another remain essentially free, the connection lines are routed from the one support beam section, through the intermediary joint, without affecting the other support beam section. The guide plates thereby provide an additional support to the base profile sections on the joint parts and with the bearing support brackets. The rotatable bearing support of the two joint parts can be attained without impairing the routing of the connection lines over the intermediary joint. The pleated bellows covers the intermediary joint through which connection lines which are routed.

Support of the joint parts in the base profile sections can, in accordance with one embodiment, be further improved by having each guide plate of the attachment plates supported on the internal wall of the crossbar of the base profile section. Each guide plate has lateral bordering units which are placed on the internal walls of the lateral limb sections of the support part.

In one embodiment, each guidance plate of the attachment plates abuts in the mounting part on the separating crossbar of the corresponding base profile section or adjusting plate, and has a threaded boring for an adjusting screw which abuts on the separating crossbar. The sides of the attachment plates oriented toward the front sides of the base profile sections are slightly inclined to the side of the same, which is turned away. The angle of inclination between the front side of the base profile section and the corresponding attachment surface of the corresponding attachment plate is each open toward the open side of the mounting part of the support beam section. Thus, the support beam sections can align with the intermediary joint and adjust into a common horizontal or vertical plane, even under stress.

In order to improve the support of the support beam sections on the intermediary joint on the attachment plates in accordance with one further embodiment, additional support attachments are integrally formed on the sides turned toward the front sides of the base profile sections. The crossbars of the base profile sections abut the attachments with their external walls.

In order for the intermediary joint to represent one unit, at least one pair of bearing support brackets are connectable or connected with one another with a bearing support element in a rotatable but non-detachable manner. A simplified pivot bearing support can be attained on the one pair of bearing support brackets when, in one pair of bearing support brackets, a bearing support bolt integrally formed on the one bearing support bracket is inserted into a bearing support bearing of the other bearing support bracket, and is supported therein in a rotatable manner.

If, in accordance with one embodiment, the bearing support brackets are aligned parallel to the guide plates, then within horizontally aligned support beam sections the mounting parts of the base profile sections are directed upwardly. Thus, the installation of the connection lines is simple.

The attachment plates can also be connected with the connecting crossbar integrally formed with the mounting part, if the areas of the attachment plates projecting over the guide plates or adjusting plates are centrally recessed, without routing the connection lines through the intermediary joint being significantly impaired as a result.

Also, in the area of the pivot bearing support of the joint parts, routing of the connection lines is hardly impaired if in one attachment plate the guide plate or adjusting plate and one of the two bearing support brackets are positioned in a single plane. In the other attachment plate, the guide plate serving or adjustment plate is positioned in the same plane while the bearing support bracket assigned to the bearing support bracket of the one attachment plate is displaced by the thickness of the bearing support bracket in the direction of the pair of bearing support brackets positioned in the area of the bearing support parts. Thus, the joint parts attach onto the ends of the base profile sections aligned in an unequivocal manner so that the attachment screws can be easily rotated.

If additional connection lines are positioned in the support parts of the base profile sections, then they can also be threaded in with the intermediary joint, if the attachment plates have a central recess which between the two bearing support brackets is aligned with the mounting space of the support part of the base profile section.

The joint parts of attachment plate, guide plates, support attachments and bearing support brackets can be easily produced in a cost-effective manner, in a single piece as a cast metal part or metallic injection molding part.

In one embodiment, the slight distance between the guide plate which can be inserted into the support part and the support attachments corresponds to the thickness of the crossbar of the base profile section.

BRIEF DESCRIPTION OF THE DRAWINGS

This invention is illustrated in greater detail in one embodiment of this invention wherein.

DESCRIPTION OF THE PREFERRED EMBODIMENTS

Figure 1:
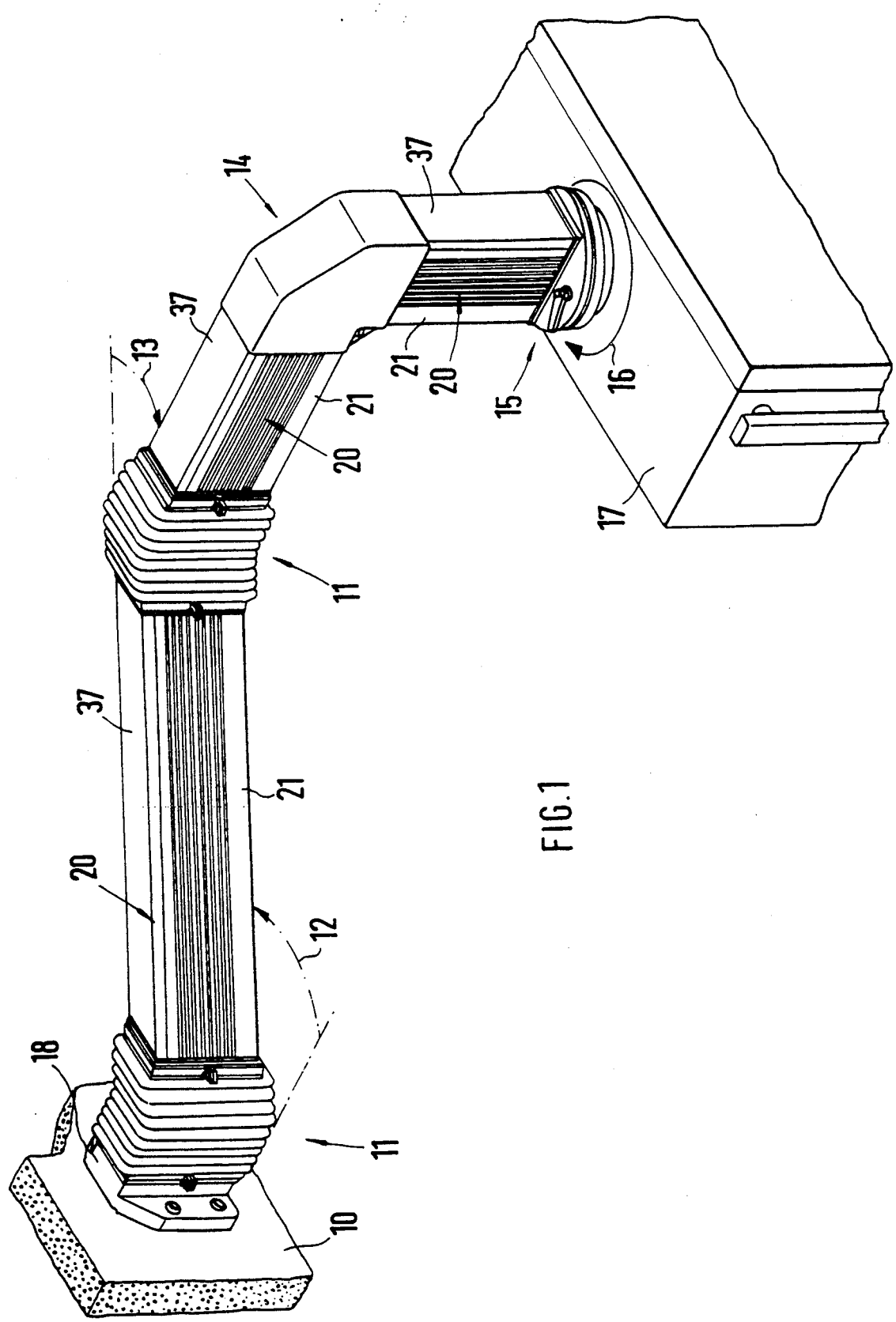
FIG. 1 is a perspective view of a complete suspension apparatus.

Reference element (10) in FIG. 1 represents a wall or the body of a machine to which the suspension apparatus, constructed as a support beam, is attached. The connection flange (18) is connected with the member (10). An intermediary joint (11) covered with a pleated bellows is attached to the connection flange (18). The connection flange (18) and the intermediary joint (11) can also be constructed as a connecting rotatable joint and represent one unit. A first horizontally aligned support beam section (20) comprising a base profile section (21) and a cove profile section (37) is attached to the intermediary joint (11). As the pivoting angle (12) indicates, the support beam section (20) can be rotated on the connecting pivot joint. The support beam section (20) is connected with the intermediary joint (11) which is covered with the pleated bellows. A further horizontal support beam section (20) is connected with the vertical support beam section (20) by means of the elbow angle (14). The pivoting angle (13) shows that both of the horizontal support beam sections (20) can be rotated relative to one another. The lower end of the vertical support beam section (20) is connected with the coupling unit (15) which supports the control device (17). As the pivoting circle (16) indicates, the control device (17) can be rotated on the vertical support beam section (20) by means of the coupling unit (15). The suspension apparatus in accordance with FIG. 1 represents only one embodiment. The support beam sections (20) have different lengths. The individual parts can also be assembled in another sequence to another suspension device.

Figure 2:
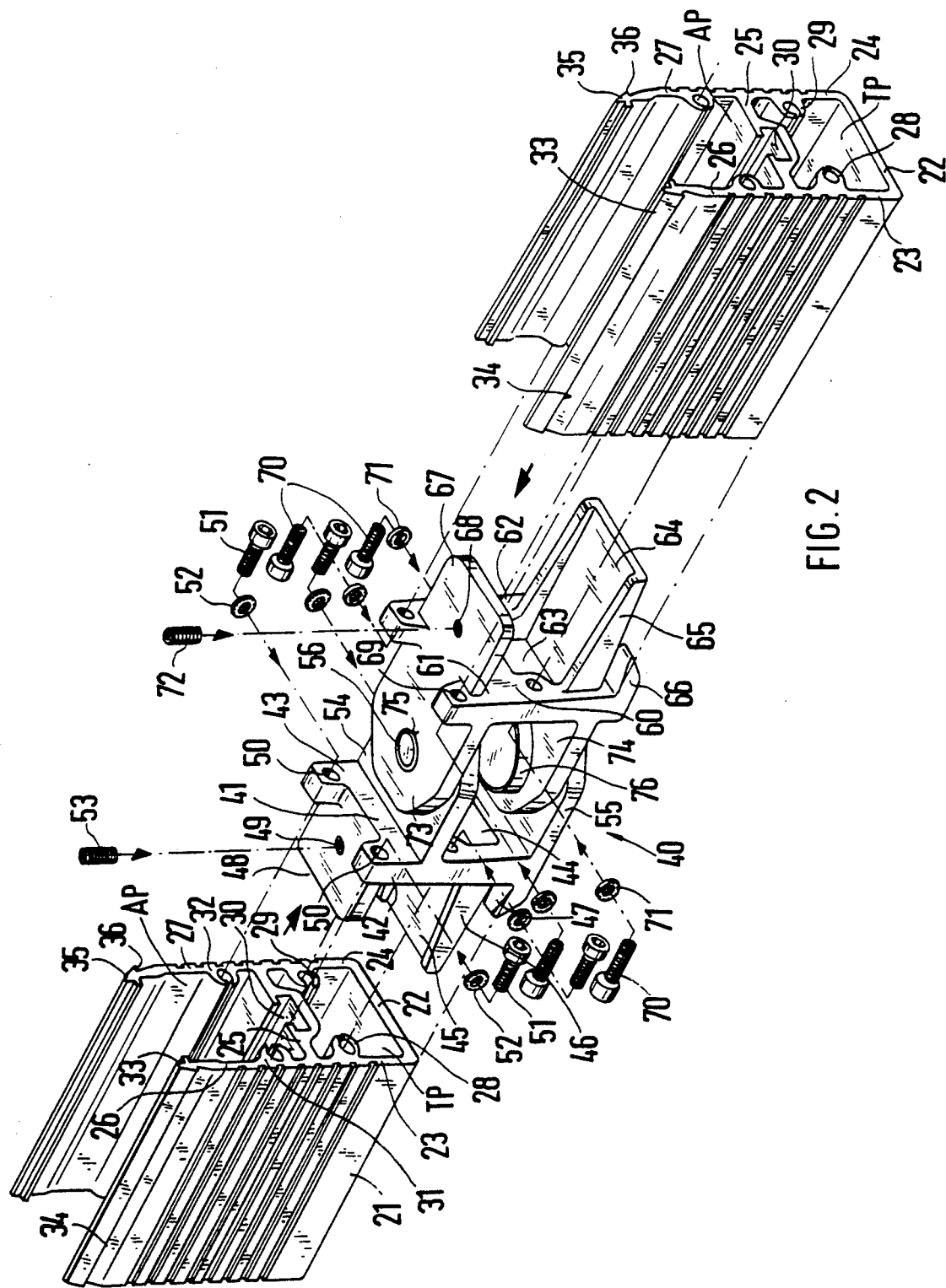
FIG. 2 is an exploded perspective view of two joint parts of the intermediary joint which are rotatably connected with one another with the two base profile sections of the support beam sections (without cover profile sections) acting on one another and connected with one another in an articulated manner.

In order to be able to prepare the support beam sections (20) in various lengths, the base profile section (21) with a corresponding profile line is broken into sections of necessary lengths. The base profile section (21) is essentially U-shaped, whereby the lateral limb sections (23 and 26, and 24 and 27) connect to the crossbar (22), as shown in FIG. 2. The separating bar (25) which is parallel to the crossbar (22) divides the base profile section (21) into the support part (TP) and the mounting part (AP). The support part (TP) is a closed hollow profile of the crossbar (22), the lateral limb sections (23 and 24), and the separating bar (25). The mounting part (AP) is formed by the separating bar (25) and the lateral limb sections (26 and 27). It is open on the side of the base profile section (21) which is turned away from the crossbar (22) and it serves as the accommodating mount for the connection lines. The support part (TP) provides the base profile section (21) with excellent stability and the open mounting part (AP) facilitates positioning of the connection lines. The lateral limb sections (26 and 27) proceed into the connection ends (33 and 35) which have rear cut sections (34 and 36). The mounting part (AP) is sealed by the U-shaped cover profile section (37), the lateral limbs of which have a suspension attachment (39) or an engaging attachment. If the suspension attachment of the lateral limb is placed into the rear-cut section (34) of the connection end (33) of the lateral limb section (26), then upon engaging the cover profile section (37), the engaging attachments of the lateral limb engage with the rear-cut section (36) in the connection end (35) of the lateral limb section (27). The cover profile section (37) can be easily detached from the mounting part (AP) of the base profile section (21).

The connection ends (33 and 35) are inwardly displaced far enough relative to the lateral limb sections (26 and 27) that the cover profile section (37) seals snugly with the external walls of its lateral limbs (38 and 38") with the external walls of the lateral limb sections (26 and 27). The rear-cut sections (34 and 36) are positioned longitudinally and penetrating. The cover profile section (37) likewise has a longitudinally positioned and penetrating suspension attachment, or an engaging attachment.

Longitudinally positioned penetrating connection crossbars (28, 29, 31 and 32) with screw mountings are integrally formed with the internal walls of the lateral limb sections (23, 24, 26 and 27). The screw mountings are opened with penetrating slit apertures so that they can easily be removed from the mold. The width of the slit aperture is such that the screw mounting extends over more than 180 degrees of its circumference, preferably over approximately 270 degrees. The slit apertures facilitate the production of the base profile section (21) in the extrusion press process. The pairs of the connecting crossbars (28 and 29, and 31 and 32) in the support part (TP) or mounting part (AP) are positioned toward one another in pairs and onto the internal walls of the lateral limb sections (23 and 24, and 26 and 27) lying opposite to one another. The central longitudinal axes of the screw mountings have approximately the same distance to the separating crossbar (25). With the screw mountings, a further portion of the suspension apparatus can simply be screwed onto the front sides of the base profile section (21).

As FIG. 2 shows, within the horizontal orientation of the support beam sections (20), the base profile sections (21) are positioned so that the mounting parts (AP) are directed upwardly and are upwardly open. Both the joint parts of the intermediary joint (40) are bolted to the front sides of the base profile sections (21). The one joint part has the attachment plate (41) in which, on the attachment side, the vertically projecting guide plates (45 and 48) are integrally formed. The sides of the guide plate (45) have rectangular projecting edging units (46). On the attachment side of the attachment plate (41) support attachments (47) are also integrally formed and support the bar (22) of the base profile section (21) which is connected on the external wall if the guide plate (45) is inserted into the support part (TP) and the guide plate (48) is inserted into the mounting part (AP) of the base profile section (21). Thus, the guide plate (45) abuts on the internal wall of the crossbar (22) and the guide plate (48) abuts in the mounting part (AP) on the separating crossbar (25).

The attachment plate (41) supports attachment borings (50) which are positioned according to the distribution of the screw mountings into the connection bars (28, 29, 31 and 32). With the attachment screws (51) and through the interposition of the disks (52), the attachment plate (41) is bolted with the front side of the base profile section. The guide plates (45 and 48) as well as the support attachments (47) produce an unequivocal coordination between the joint part and the base profile section (21). The guide plate (48) or adjusting plate has the threaded boring (49) into which the adjusting screw (53) is screwed. The attachment surface of the attachment plate (41) is slightly inclined, specifically in such a manner that there is an inclination of approximately 2 degrees to the opened mounting part (AP). The angle of inclination of 2 degrees is maintained between the front side of the base profile section (21) and the attachment surface of the attachment plate (41), which is turned toward the same.

The adjusting screw (53) abuts on the separating crossbar (25) s that the base profile section (21) can be oriented to the joint part before tightening the attachment bolts (53). The part of the attachment plate (41) protruding over the guide plate (48) is centrally recessed so that the connection lines, which are led out from the mounting part (AP) of the base profile section (21) can be conducted through the intermediary joint and into the mounting part (AP) of the base profile section (21), which is attached onto the other joint part. In the area of the support part (TP), the attachment mounting plate (41) has the recess (44) so that in the support part (TP), threaded connection lines can be further conducted through the joint part of the intermediary joint (40).

The other joint part is similarly positioned with the mounting attachment plate (60) and the attachment borings (69), the guide plate (67) with the edging units (65) of the guide plate (67), the recess (63) and the support attachments (66) provided as adjusting plates with the threaded boring (68) for the adjusting screw (72), with the joint part with the attachment plate (41) and the corresponding parts. The attachment screws (70) through intermediary positioning of the disks (71), connect the attachment mounting plate (60) on the front side of the other base profile section (21). The attachment surface of the mounting plate (60) turned toward the front side of the base profile section (21) is again slightly inclined, so that with the adjusting screw (72) the orientation of the other base profile section (21) to the other joint part can be similarly carried out.

Both joint parts are articulately connected with one another on the sides of the attachment plates (41 and 60) which are oriented to one another. The joint axis proceeds parallel to the attachment plates (41 and 60) as well as perpendicular to the guide plates (45, 48, 64 and 67). Two bearing support brackets placed at a distance to one another (54 and 55, and 73 and 74), which are parallel to the guide plates (45 and 48, and 64 and 67), are integrally formed with each attachment plate (41 and 60). In one joint part, the upper bearing support bracket (54) is displaced by the thickness of the bearing support bracket (73) of the other joint part in the direction toward the support part (TP) of the base profile section (21). In the other joint part, the upper bearing support bracket (73) is positioned in one plane with the guide plate (67). Thus, after the connection of the joint parts with the base profile sections (21), the guide plates (48 and 67) or adjusting plates as well as the support bearing bracket (73) are positioned above the separating bars (25) and project into the mounting parts (AP). There is sufficient space for routing the connection lines in the area above the intermediary joint (40) between the recessed parts of the attachment plates (41 and 60).

The second pair of bearing support brackets (55 and 74) is, in the area of the support parts (TP), displaced relative to one another by the thickness of the bearing support brackets. The bearing support element (76) connects such pair of bearing support brackets (55 and 74) in a rotatable but non-detachable manner so that the intermediary joint (40) represents a single unit. The bearing support bolt (56) which is supported in a rotatable manner in the bearing support boring (75) of the bearing support bracket (73) is integrally formed with the bearing support bracket (54). Both the joint parts are rotatable to a limited degree, until the attachment plates (41 and 60) engage with one another and/or the bearing support brackets (54 and 55, and 73 and 74) engage with the attachment plates (41 and 60). The angle of rotation is at least 180 degrees.

If the connection lines are attached, then the mounting parts (AP) of the base profile sections (21) are sealed with the cover profile sections (37) and the bearing support beam sections (20) are completed. The intermediary joint (40) is covered with a pleated bellows unit which protects the connection lines, as FIG. 1 shows. The pleated bellows is attached to the ends of the support beam sections (20) and is preferably opened with a slide fastener, or the like, in order to maintain easy access to the intermediary joint (40).

We claim:

1. In a suspension apparatus for control devices which can be assembled from a connection flange, connection rotary joint, support beam sections, elbow joints, and intermediary joints, which can be connected with a wall and a body of a machine, and a coupling unit which can be connected to the control device, in which the support beam sections each comprise an essentially U-shaped base profile section and a cover profile section closing the same, the base profile section being divided with a separating bar parallel to a crossbar and proceeding into a support part constructed as a closed hollow profile and an open U-shaped mounting part opposed to the separating bar, and in which connecting bars which proceed in a longitudinal direction in the support bar and in the mounting part are integrally formed with screw mountings, the improvement comprising:

said intermediary joints (11, 40) having two mounting attachment plate (41, 60), which occupy less than a cross-section of said mounting parts (AP) of said base profile section (21) and have borings (50, 69) for attachment mounting screws (51, 70) oriented to a distribution of screw mountings into said connecting bars (28, 29, 31, 32) of said base profile sections (21) of said support beam sections (20) acting on one another;

first, second, third and fourth vertically projecting guide plates (45, 48; 64, 67), insertable into said support part (TP) and said mounting part (AP) of said base profile sections (21) and abutting therein, integrally formed on sides of said mounting attachment plates (41, 60) positioned toward front sides of said base profile section (21);

first, second, third and fourth spaced bearing support brackets (54, 55 and 73, 74) said first and third bearing support brackets displaced relative to said second and fourth bearing support brackets by a thickness of said bearing support brackets (54, 55, 73, 74) having aligning bearing support borings (75) for accommodating at least one of bearing support bolts (56) and bearing support elements (76), said spaced bearing support brackets (54, 55 and 73, 74) each integrally formed projecting vertically to sides of said attachment plates (41, 60); and each said intermediary joint (11, 40) covered with a pleated bellows fixed onto said base profile sections (21), closed with said cover profile sections (37) of said base profile sections (21) of said support beam sections (20) acting on one another.

2. In a suspension apparatus in accordance with claim 1, wherein:

each of said first and third guide plates (45, 64) of said attachment mounting plates (41, 60) abuts on an internal wall of said crossbar (22) of a coordinated said base profile section (21) and has lateral edging units (46, 65) applied onto internal walls of lateral limb sections (23, 24) of said support part (TP).

3. In a suspension apparatus in accordance with claim 2, wherein:

each of said second and fourth guide plates (48, 67) of said attachment mounting plates (41, 60) in said mounting part (AP) abuts a separating crossbar (25) of a coordinated said base profile section (21) and has a threaded boring (49, 68) for an adjusting screw (53, 72) which abuts said separating crossbar (25); and sides of said attachment mounting plates (41, 60) turned toward said front sides of said base profile sections (21) are slightly inclined to a side of said base profile sections (21) which is turned away, whereby an angle of inclination between said front side of said base profile section (21) and of an attachment surface of a coordinated said attachment mounting plate (41, 60) which is turned toward said attachment mounting plate (41, 60) is each open to an open side of said mounting attachment part (AP) of said support beam section (20).

4. In a suspension apparatus in accordance with claim 3, wherein:

additional support attachments (47, 66) having external walls abutting said crossbars (22) of said base profile sections (21) and are integrally formed with said attachment mounting plates (41, 60) on sides turned toward said front sides of said base profile sections (21).

5. In a suspension apparatus in accordance with claim 4, wherein:

at least one pair of said bearing support brackets (55, 74) are attachable to one another with one of said bearing support elements (76) in a rotatable but non-detachable manner.

6. In a suspension apparatus in accordance with claim 5, wherein:

in one pair of said bearing support brackets (54, 73), each said bearing support bolt (56) integrally formed on one said bearing support bracket (54) is inserted into a bearing support boring (75) of another said bearing support bracket (73) and is rotatably supported therein.

7. In a suspension apparatus in accordance with claim 6, wherein:

said bearing support brackets (54, 55 and 73, 74) are parallel to said guide plates (45, 48 and 64, 67).

8. In a suspension apparatus in accordance with claim 7, wherein:

areas of said attachment mounting plates (41, 60) projecting over said second and fourth guide plates (48, 67) are centrally recessed.

9. In a suspension apparatus in accordance with claim 8, wherein:

in one said attachment mounting plate (60), said fourth guide plate (67) and one of said two bearing support brackets (73) are positioned in one plane; and in another said attachment mounting plate (41), said second guide plate (48) is positioned in a same plane, said first bearing support bracket (54) coordinated to said third bearing support bracket (73) of said attachment mounting plate (60) is displaced by a thickness of said bearing support bracket (73) in a direction of said second and fourth bearing support brackets (55, 74) positioned near said support parts (TP).

10. In a suspension apparatus in accordance with claim 9, wherein:

a slight distance between said guide plate (45, 64) which can be inserted into said support part (TP) and said support attachments (47, 66) corresponds to a thickness of said crossbar (22) of said base profile section (21).

11. In a suspension apparatus in accordance with claim 10, wherein:

said attachment mounting plates (41, 60) between both of said bearing support brackets (54, 55 or 73, 74) have a central recess (44, 63) oriented toward a mounting space of said support part (TP) of said base profile section (21).

12. In a suspension apparatus in accordance with claim 11, wherein:

each said attachment mounting plate (41, 60) with integrally formed said first, second, third and fourth guide plates (45, 48, 64, 67), said support attachments (47, 66) and said bearing support brackets (54, 55, 73, 74) form a joint part which is produced as at least one of a cast metal part and a metal injection molded part.

13. In a suspension apparatus in accordance with claim 1, wherein:
   each of said second and fourth guide plates (48, 67) of said attachment mounting plates (41, 60) in said mounting part (AP) abuts a separating crossbar (25) of a coordinated said base profile section (21) and has a threaded boring (49, 68) for an adjusting screw (53, 72) which abuts said separating crossbar (25); and
   sides of said attachment mounting plates (41, 60) turned toward said front sides of said base profile sections (21) are slightly inclined to a side of said base profile sections (21) which is turned away, whereby an angle of inclination between said front side of said base profile section (21) and of an attachment surface of a coordinated said attachment mounting plate (41, 60) which is turned toward said attachment mounting plate (41, 60) is each open to an open side of said mounting attachment part (AP) of said support beam section (20).

14. In a suspension apparatus in accordance with claim 1, wherein:
   additional support attachments (47, 66) having external walls abutting said crossbars (22) of said base profile sections (21) and are integrally formed with said attachment mounting plates (41, 60) on sides turned toward said front sides of said base profile sections (21).

15. In a suspension apparatus in accordance with claim 1, wherein:
   at least one pair of said bearing support brackets, (55, 74) are attachable to one another with each of said bearing support elements (76) in a rotatable but non-detachable manner.

16. In a suspension apparatus in accordance with claim 1, wherein:
   in one pair of said bearing support brackets (54, 73), each said bearing support bolt (56) integrally formed on one said bearing support bracket (54) is inserted into a bearing support boring (75) of another said bearing support bracket (73) and is rotatably supported therein.

17. In a suspension apparatus in accordance with claim 1, wherein:
   said bearing support brackets (54, 55 and 73, 74) are parallel to said guide plates (45, 48 and 64, 67).

18. In a suspension apparatus in accordance with claim 1, wherein:
   areas of said attachment mounting plates, (41, 60) projecting over said second and fourth guide plates (48, 67) are centrally recessed.

19. In a suspension apparatus in accordance with claim 1, wherein:
   in one said attachment mounting plate (60), said fourth guide plate (67) serving as an adjusting plate, and one of said two bearing support brackets (73) are positioned in one plane; and
   in another said attachment mounting plate (41), said second guide plate (48) serving as another adjusting plate is positioned in a same plane, said first bearing support bracket (54) coordinated to said third bearing support bracket (73) of said attachment mounting plate (60) is displaced bay a thickness of said bearing support bracket (73) in a direction of said second and fourth bearing support brackets (55, 74) positioned near said support parts (TP).

20. In a suspension apparatus in accordance with claim 1, wherein:
   a slight distance between said guide plate (45, 64) which can be inserted into said support part (TP) and said support attachments (47, 66) corresponds to a thickness of said crossbar (22) of said base profile section (21).

21. In a suspension apparatus in accordance with claim 1, wherein:
   said attachment mounting plates (41, 60) between both of said bearing support brackets (54, 55 or 73, 74) have a central recess (44, 63) oriented toward a mounting space of said support part (TP) of said base profile section (21).

22. In a suspension apparatus in accordance with claim 1, wherein:
   each said attachment mounting plate (41, 60) with integrally formed said guide plates (45, 48, 64, 67), said support attachments (47, 66) and said bearing support brackets (54, 55, 73, 74) form a joint part which is produced as at least one of a cast metal part and a metal injection molded part.

* * * * *